United States Patent [19]
Titterington et al.

[11] Patent Number: 6,015,847
[45] Date of Patent: Jan. 18, 2000

[54] MAGENTA PHASE CHANGE INK FORMULATION CONTAINING ORGANIC SULFONIC ACID

[75] Inventors: Donald R. Titterington, Tualatin; Michael B. Meinhardt, Salem; Jeffery H. Banning, Hillsboro; Clifford R. King, Salem, all of Oreg.

[73] Assignee: Tektronix, Inc., Wilsonville, Oreg.

[21] Appl. No.: 09/023,816

[22] Filed: Feb. 13, 1998

[51] Int. Cl.⁷ .......................... C09D 11/02; C09D 11/10; C09D 175/04; C08K 5/42; C08L 75/04
[52] U.S. Cl. ..................... 523/160; 106/31.29; 524/590
[58] Field of Search .................... 523/160, 161; 106/31.29, 31.3, 31.31; 524/590

[56] References Cited

U.S. PATENT DOCUMENTS

| | | | |
|---|---|---|---|
| 2,409,712 | 10/1946 | Schweitzer | 260/453 |
| 3,012,991 | 12/1961 | Schultheis et al. | 260/75 |
| 3,653,932 | 4/1972 | Berry et al. | 106/22 |
| 3,751,312 | 8/1973 | Wright et al. | 558/6 |
| 3,963,679 | 6/1976 | Ullrich et al. | 260/75 |
| 3,963,710 | 6/1976 | Aufdermarsh, Jr. | 260/247.2 |
| 4,010,252 | 3/1977 | Hewitt | 424/47 |
| 4,011,311 | 3/1977 | Noomen et al. | 424/65 |
| 4,293,470 | 10/1981 | Cuscurida | 260/45.9 |
| 4,297,501 | 10/1981 | Becker et al. | 560/24 |
| 4,334,032 | 6/1982 | Patton, Jr. et al. | 521/115 |
| 4,381,403 | 4/1983 | Falcone et al. | 560/24 |
| 4,390,369 | 6/1983 | Merritt et al. | 106/31 |
| 4,484,948 | 11/1984 | Merritt et al. | 106/31 |
| 4,501,915 | 2/1985 | McCoy | 560/157 |
| 4,537,960 | 8/1985 | Merger et al. | 544/86 |
| 4,665,146 | 5/1987 | Tortorello et al. | 526/304 |
| 4,684,956 | 8/1987 | Ball | 346/1.1 |
| 4,810,820 | 3/1989 | Slack et al. | 560/27 |
| 4,851,045 | 7/1989 | Taniguchi | 106/31 |
| 4,889,560 | 12/1989 | Jaeger et al. | 106/27 |
| 4,889,761 | 12/1989 | Titterington et al. | 428/195 |
| 5,006,170 | 4/1991 | Schwarz et al. | 106/20 |
| 5,059,647 | 10/1991 | Kawaguchi | 524/100 |
| 5,151,120 | 9/1992 | You et al. | 106/27 |
| 5,195,430 | 3/1993 | Rise | 100/168 |
| 5,221,335 | 6/1993 | Williams et al. | 106/23 |
| 5,372,852 | 12/1994 | Titterington et al. | 427/288 |
| 5,389,720 | 2/1995 | Markusch et al. | 524/839 |
| 5,389,958 | 2/1995 | Bui et al. | 347/103 |
| 5,427,611 | 6/1995 | Shirota et al. | 106/31.29 |
| 5,462,592 | 10/1995 | Murakami et al. | 106/31.43 |
| 5,496,879 | 3/1996 | Griebel et al. | 524/320 |
| 5,514,209 | 5/1996 | Larson, Jr. | 523/161 |
| 5,514,733 | 5/1996 | Ito et al. | 523/161 |
| 5,518,534 | 5/1996 | Pearlstine et al. | 106/31.75 |
| 5,607,501 | 3/1997 | Fujioka | 106/31.29 |
| 5,621,022 | 4/1997 | Jaeger et al. | 523/161 |
| 5,683,502 | 11/1997 | Badejo et al. | 106/495 |
| 5,821,384 | 10/1998 | Zoeller et al. | 560/231 |
| 5,830,942 | 11/1998 | King et al. | 524/590 |
| 5,853,465 | 12/1998 | Tsang et al. | 106/31.25 |

FOREIGN PATENT DOCUMENTS

| | | |
|---|---|---|
| 0187352 | 7/1986 | European Pat. Off. . |
| 0206286 | 12/1986 | European Pat. Off. . |
| 4205636 | 8/1993 | Germany . |
| 4205713 | 8/1993 | Germany . |
| 2294939 | 5/1996 | United Kingdom . |
| 9404619 | 3/1994 | WIPO . |
| 9414902 | 7/1994 | WIPO . |
| 9712003 | 4/1997 | WIPO . |
| 9713816 | 4/1997 | WIPO . |

OTHER PUBLICATIONS

"Polymer Chemistry—The Basic Concepts" by Paul C. Hiemenz, California State Polytechnic University, Pomona, California, p. 7.

"Technical Product Information" Luxate• Isophorone Diisocyanate, by Olin Chemicals, Olin Corporation, 2 pgs.

"Advanced Organic Chemistry" Reactions, Mechanisms, and Structure, Third Edition, by Jerry March, Professor of Chemistry, Adelphi Univerisity, 6 pgs.

Leach, R.H. and Pierce, R.J.; The Printing Ink Manual, Blueprint London (pp. 162–163), 1993.

*Primary Examiner*—Vasu Jagannathan
*Assistant Examiner*—Callie E. Shosho
*Attorney, Agent, or Firm*—Ralph D'Alessandro; William A. Simons; Charles F. Moore

[57] ABSTRACT

A phase change ink composition comprising a phase change carrier composition, at least one compatible phase change magenta colorant material, and at least one organic sulfonic acid compound is disclosed. The sulfonic acid stabilizes the magenta dye.

22 Claims, No Drawings

MAGENTA PHASE CHANGE INK FORMULATION CONTAINING ORGANIC SULFONIC ACID

BACKGROUND OF THE INVENTION

1. Field of the Invention

The present invention relates generally to magenta-colored phase change inks. More particularly, the present invention relates to a phase change ink composition containing the combination of (a) a phase change carrier composition; (b) at least one compatible phase change magenta colorant material; and (c) at least one organic sulfonic acid. Still further, the present invention relates to processes of using these phase change ink compositions in a printing device.

2. Description of the Relevant Art

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition, which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. Pat. No. 5,621,022 issued Apr. 15, 1997, and assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium and the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks. Some representative examples include U. S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT Patent Application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65 C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene glycol phenyl ether (PPL)); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT Application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

Furthermore, U.S. Pat. No. 5,830,942, assigned to the Assignee of the present invention, teaches phase change carrier compositions that comprise the combination of a urethane resin with a urethane/urea resin that may optionally contain other ingredients such as mono-amides and polyethylene waxes. However, that U.S. patent application does not teach or explicitly suggest a phase change carrier composition that contains the combination of three critical ingredients of the carrier compositions of the present invention.

When certain magenta colorant materials are utilized in phase change inks, several technical problems may arise that may prevent the best use of these materials. First, the magenta color does not develop completely; second, the magenta dye may migrate or "diffuse", thereby degrading print quality over time; and third, the magenta color may darken upon exposure to light. Accordingly, there is a need to solve these problems. The present invention offers a solution to these problems.

BRIEF SUMMARY OF THE INVENTION

One aspect of the present invention is directed to phase change ink compositions comprising an admixture of (a) a phase change carrier composition; (b) at least one compatible phase change magenta-colored colorant material; and (c) at least one organic sulfonic acid compound.

Yet another aspect of the present invention is a method for producing a layer of a phase change colored ink on the surface of a substrate by either direct or indirect printing wherein the phase change ink composition in the solid phase comprises the above-noted admixture.

Features of the phase change inks of the present invention include more fully developed magenta color; an ink that diffuses less readily; and an ink having more light-stability, when compared to similar inks not containing an organic sulfonic acid compound. It is believed that the sulfonic acid compound or compounds bias certain magenta colorant materials into more stable physical forms which decrease their mobility in the ink matrix and fully develop the color strength of the magenta colorant.

It is an advantage of the present invention that phase change ink compositions of the present invention have improved stability, utility and quality that make them more desirable for a wider variety of applications.

DESCRIPTION OF THE PREFERRED EMBODIMENTS

The term "phase change carrier composition" as used in the present specification refers to any combination of suitable materials, other than magenta colorant materials and organic sulfonic acid compounds described below, that may be used in phase change inks. This includes the materials described in the above-noted patents and patent applications. One preferred class of phase change carrier compositions includes isocyanate resin-based carriers described in the above-noted U.S. Pat. No. 5,830,942 and other U.S. Patent Applications assigned to the same assignee. Another preferred class of phase change carriers is the tetra-amide-based carriers described in U.S. Pat. No. 4,889,560 (Jaeger et al.); U.S. Pat. No. 4,889,761 (Titterington et al.); U.S. Pat. No. 5,372,852 (Titterington et al.) and U.S. Pat. No. 5,621,022 (Jaeger et al.).

The phrase "at least one compatible phase change magenta colorant material" as used in the present specification and claims refers to one or more magenta-colored colorant materials that are useful in making phase change inks and are also compatible with the phase change carrier composition also present in the same phase change ink. These magenta colorant materials are "rhodamine-type" magenta colorants as exemplified by dyes such as Solvent Red 49, Solvent Red 127 and the like.

The term "at least one organic sulfonic acid compound" as used in the present specification and claims refers to any organic compound having one or more sulfonic acid moieties.

The phase change carrier composition, as stated above, preferably contains any of the isocyanate resin-based carriers described in the aforementioned U.S. Pat. No. 5,830,942. These include urethane resins, urea resins, and mixed urethane/urea resins made from various isocyanates, alcohols and amines.

The term "nucleophile" in the present specification and claims is used as defined on page 179 of "Advanced Organic Chemistry", 3rd Edition by Jerry March, ©1985 published by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, ©1984 published by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The terms "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

The term "urethane resin" or "urethane isocyanate-derived resin" as used in the present specification and claims is defined as any resin that is a urethane which is the product of the reaction of an isocyanate and an alcohol.

The term "mixed urethane/urea resin" or "urethane/urea isocyanate-derived resin" as used in the present specification and claims is defined as any resin that is a mixed urethane/urea which is the product of the reaction of an isocyanate, an alcohol and an amine.

Any suitable reaction condition for making urethane resins or mixed urethane/urea resins by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate™ IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s of about −30° C. to about 100° C. The isocyanate-derived waxes from these reactions are generally opaque waxy solids having sharp melting points from about 50° C. to about 130° C., and viscosities of about 1 cPs to about 25 cPs at 140° C. The isocyanate-derived resins and waxes display properties such that the higher the $T_g$ and the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 3 in the aforementioned U.S. Pat. No. 5,830,942. Varying one or more of the readily available commodity chemicals used as chemical precursors will permit custom-tailoring of the properties of the isocyanate-derived resin and wax materials.

Preferred alcohols to react with difunctional and higher isocyanates to make either the urethane resins or the urethane/urea resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates of octyl, nonyl, and dodecylphenol, and alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred amines to react with difunctional and higher isocyanates to make the mixed urethane/urea resins of this invention include any monofunctional amine, with the exception of tertiary amines void of other nucleophilic functional groups (e.g., triethylamine). For instance, the mono-amine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-,t-, and the like) octyl amine, (n-, iso-, t-, and the like) nonyl amine, (n- and branched) decyl amine, (n- and branched) undecyl amines, (n- and branched) dodecyl amines, (n- and branched) hexa- decyl amines, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex. 1; 3,3'-diamino-N-methyl-dipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the mixed urethane/urea resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-) propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<3000), polypropylene glycol (MW<3000), polyester polyols (MW<3000), polyethylene glycol (MW<3000), pentaerythritol, triethanol amine, glycerin, 1,6-hexanediol, N-methyl-N,N-diethanol amine, trimethylol propane, N,N, N',N'-tetrakis(2-hydroxypropyl)ethylenediamine, and the like. The preferred alcohol is octadecanol.

Preferred amines to react with monofunctional isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like) octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex. 1; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylamino-propylamine; 4,7,10-trioxa- 1,13-tridecanediamine; diethylene triamine; 3,3 -diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally, amides or other nucleophile containing compounds can be reacted with the isocyanates (mono, di, and the like). Some examples include: urea, oleamide, stearamide, or the like.

Preferred precursors to the urethane resins and urethane/urea resins of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}$ MDI); tetra-methyl xylene diisocyanate (TMXDI); hexamethylene- 1,6-diisocyanate (HDI); hexamethylene- 1,6-diisocyanate; naphthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

When an isocyanate-based phase change carrier system is used, the isocyanate-based resin or resins are preferably used in combination with at least one mono-amide.

A mono-amide compound typically comprises either a primary or secondary mono-amide, but is preferably a secondary mono-amide. Of the primary mono-amides, stearamide, such as KEMAMIDE S manufactured by Witco Chemical Company, can be employed herein. As for the secondary mono-amides, behenyl benenamide (KEMAMIDE EX-666) and stearyl stearamide (KEMAMIDE S-180), both manufactured by Witco Chemical Company, are extremely useful mono-amides. However, stearyl stearamide (KEMAMIDE S-180) is the mono-amide of choice in producing the phase change ink compositions of the present invention.

Also, when an isocyanate-based phase change carrier system is used, the carrier may optionally contain at least one polyethylene wax.

Preferably, the polyethylene wax has a molecular weight of about 500 to about 5,000; more preferably, of about 700 to about 2,000; and, most preferably, of about 800 to 1,200. Preferred polyethylene waxes are Polywax 850, Polywax 1000 or Polywax 2000, all available from Petrolite.

Most preferably, the phase change carrier composition comprises (a) a urethane resin that is the reaction product of the reaction of at least one alcohol and an isocyanate, wherein the alcohol is selected from the group consisting of a monohydric aliphatic alcohol, a monohydric aromatic alcohol, a monohydric aliphatic/aromatic alcohol, a monohydric fused ring alcohol, a polyol and mixtures thereof; and/or (b) a mixed urethane/urea resin that is the reaction product of at least one alcohol, an isocyanate, and at least one amine; and (c) at least one mono-amide; and, optionally (d) at least one polyethylene wax.

Preferably, the total amount of urethane resin or resins in the phase change carrier composition and the inks made therefrom will comprise about 10% to about 40%, more preferably, about 15–35% and most preferably, about 20–30%, by weight of the carrier composition. Preferably, the total amount of mixed urethane/urea resin or resins in the phase change carrier composition will likewise comprise about 10% to about 40%, more preferably about 15–35% and most preferably, about 20–30%, by weight of the carrier composition. Preferably, the total amount of mono-amide wax and polyethylene wax combined will comprise about 40% to about 70%, more preferably, about 45–60% and most preferably about 48–57% by weight of the carrier composition.

If the polyethylene wax is employed, the ratio of mono-amide wax to the polyethylene wax is preferably from about 200:1 to 9:1, by weight. More preferably, this ratio is from about 50:1 to about 12:1, by weight and, most preferably, about 25:1 to about 16:1, by weight.

Alternatively, the phase change carrier composition used in the inks of the present invention may be based on a tetra-amide-containing material as described above or any of the materials described in the earlier discussions of materials for use in phase change inks.

Phase change inks of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change carrier composition and the inks made therefrom which collectively comprise the current invention can contain a combination of urethane resins and urethane/urea resins, along with two other critical ingredients. These three critical ingredients can be supplemented with (one or more) optional ingredients to prepare commercial phase change carrier compositions. The urethane resins and mixed urethane/urea resin materials of the current invention are tailored to have the desirable properties mentioned above when used in the carrier composition of the inks of the present invention by varying one or more of the readily available commodity chemical precursors.

The phase change carrier compositions of the current invention producing an improved magenta may be used in combination with certain dyes that are compatible with the carrier. These dyes are generally known as Rhodamine dyes. Examples of this group that are pertinent to this invention are Solvent Red 49 and Solvent Red 127.

The third critical ingredient of the present invention is at least one organic sulfonic acid compound. Preferably, the organic sulfonic acid compound is an alkyl benzene sulfonic acid. Most preferably, the organic sulfonic acid compound is para-toluene-sulfonic acid or dodecylbenzenesulfonic acid.

The amount of organic sulfonic acid compound is preferably from about 2% to about 100% by weight of total magenta colorant material in the ink. More preferably, this amount is from about 5% to about 30%, by weight of the total magenta colorant material in the ink. The amount of magenta colorant material in the ink is from about 0.1 to about 10% by weight of the total weight of the ink. A more preferred amount of magenta colorant material in the ink is from about 0.5 to about 5% by weight of the total weight of the ink. The preferred amount of magenta colorant material in the ink is from about 1% to about 3% by weight of the total weight of the ink.

This invention is also pertinent to the types of phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. The typical mono-amide is stearyl stearamide. A preferred tackifier resin is a glycerol ester of hydrogenated abietic (rosin) acid and a preferred antioxidant is that provided by Uniroyal Chemical Company under the tradename Naugard 445.

Many other patents, including the aforementioned representative examples, describe other materials for use in phase change ink jet inks. As described earlier, these other materials can include paraffins, microcrystalline waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the phase change carrier composition of this invention could optionally contain any of the optional other materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the materials of this current invention could be compatible with those materials and could also be used in that application or other similar printing methods that employ hot melt ink technology.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or print head;

(3) raising the operating temperature of the application means or print head to a level whereby a liquid phase, phase change colored ink composition is formed;

(4) providing a substrate in proximity to the application means;

(5) applying a predetermined pattern of the liquid phase, phase change colored ink composition to at least one surface of the substrate; and (6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or a print head;

(3) raising the operating temperature of the application means or print head to a level whereby a liquid phase, phase change colored ink composition is formed;

(4) providing an intermediate transfer surface in proximity to the application means;

(5) applying a predetermined pattern of the liquid phase, phase change colored ink composition to the intermediate transfer surface;

(6) lowering the temperature of the applied ink composition to form a solid phase, phase change ink pattern on the intermediate transfer surface at a second, intermediate temperature;

(7) transferring said phase change ink composition from the intermediate transfer surface to a final substrate; and (8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative.

EXAMPLE 1

Maggenta Ink Made From Urethane/Urea Resins, Amide Wax, Mixed Magenta Dyes and No Alkybenzene Sulfonic Acid Additive.

In a stainless steel beaker were combined 228 grams of urethane resin from Example 5 of U.S. Pat. No. 5,830,942, 228 grams of the urethane/urea resin from Example 2 of the same patent, 515 grams of Witco S-180 stearyl stearamide wax[1], and 1.9 grams of Uniroyal Naugard 445 antioxidant[2]. The materials were melted for about 3 hours at 125° C. in an oven, then blended by stirring in a temperature controlled mantle for ½ hr. at 125° C. To the molten ink base was added 2.90 grams of Solvent Red 127 dye[3], and 19.2 grams of Solvent Red 49[4]. The resulting magenta ink was then stirred for an additional 2 hours at 125° C. The ink was then filtered through a heated (125° C.) Mott apparatus (available from Mott Mettalurgical) using a $2\mu$ filter at 5 psi. The ink was then poured into molds and allowed to solidify to form ink sticks. This final magenta ink product was characterized by the following physical properties: viscosity of about 13.8 cPs at 140° C. as measured by a Ferranti-Shirley cone-plate viscometer, and a melting point at about 91° C. as measured by differential scanning calorimetry using a DuPont 2100 calorimeter. The Tg of this ink was not measured. The spectral strength of this ink was measured as about 3552 milliliters.Absorbance Units per gram at a lambda$_{max}$ of 555 nm as measured by dilution in n-butanol using a Perkin-Elmer Lambda 25 UV/VIS spectrophotometer. This ink was placed in a Phaser® 340 printer, which uses an offset transfer printing process. The ink was printed using a print head temperature of 140° C., a drum temperature of 60° C. and a paper preheat temperature of 60° C. The finished prints were found to have a color value as measured in an ACS spectrophotometer of L*=66.3, a*=61.1, and b*=−18.9.

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading, Pa.
[4] Neptun Red Base NB 543 LD—Dye available from BASF Co., Renssalear, N.Y.

EXAMPLE 2

Magenta Ink Made From Urethane/Urea Resins, Amide Wax, Mixed Magenta Dyes and 0.48% Alkybenzene Sulfonic Acid Additive.

In a stainless steel beaker were combined 228 grams of urethane resin from Example 5 of U.S. Pat. No. 5,830,942, 228 grams of the urethane/urea resin from Example 2 of the same patent, 515 grams of Witco S-180 stearyl stearamide wax[1], and 1.9 grams of Uniroyal Naugard 445 antioxidant[2]. The materials were melted for about 3 hours at 125° C. in an oven, then blended by stirring in a temperature controlled mantle for ½ hr. at 125° C. To the molten ink base was added 2.90 grams of Solvent Red 127 dye[3] 19.2 grams of Solvent Red 49 dye[4] and 4.8 grams of dodecylbenzene sulfonic acid[5]. The resulting magenta ink was then stirred for an additional 2 hours at 125° C. The ink was then filtered through a heated (125° C.) Mott apparatus (available from Mott Mettalurgical) using a $2\mu$ filter at 5 psi. The ink was then poured into molds and allowed to solidify to form ink sticks. This final magenta ink product was characterized by the following physical properties: viscosity of about 13.8 cPs at 140° C. as measured by a Ferranti-Shirley cone-plate viscometer, and a melting point at about 91° C. as measured by differential scanning calorimetry using a DuPont 2100 calorimeter. The Tg of this ink was not measured. The spectral strength of this ink was measured as about 3552 milliliters.Absorbance Units per gram at a lambda$_{max}$ of 555 nm as measured by dilution in n-butanol using a Perkin-Elmer Lambda 25 UV/VIS spectrophotometer. This ink was placed in a Phaser® 340 printer which uses an offset transfer printing process. The ink was printed using a print head temperature of 140° C., a drum temperature of 60° C. and a paper preheat temperature of 60° C. The finished prints were found to have a color value as measured in an ACS spectrophotometer of L*=53.4, a*=80.33, and b*=−28.8,

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading, Pa.
[4] Neptun Red Base NB 543 LD—Dye available from BASF Co., Renssalear, N.Y.
[5] Biosoft S-100—Acid available from Stepan Co., Northfield, Ill.

EXAMPLE 3

Magenta Ink Made From Urethane/Urea Resins, Amide Wax, Mixed Magenta Dyes and 0.68% Alkybenzene Sulfonic Acid Additive.

In a stainless steel beaker were combined 228 grams of urethane resin from Example 5 of U.S. Pat. No. 5,830,942, 228 grams of the urethane/urea resin from Example 2 of the same application, 515 grams of Witco S-180 stearyl stearamide wax[1], and 1.9 grams of Uniroyal Naugard 445 antioxidant[2]. The materials were melted for about 3 hours at 125° C. in an oven, then blended by stirring in a temperature controlled mantle for ½ hr. at 125° C. To the molten ink base was added 2.90 grams of Solvent Red 127 dye[3] 19.2 grams of Solvent Red 49 dye[4] and 6.8 grams of dodecylbenzene sulfonic acid[5]. The resulting magenta ink was then stirred for an additional 2 hours at 125° C. The ink was then filtered through a heated (125° C.) Mott apparatus (available from Mott Mettalurgical) using a 2μ filter 5 psi. The ink was then poured into molds and allowed to solidify to form ink sticks. This final magenta ink product was characterized by the following physical properties: viscosity of about 13.8 cPs at 140° C. as measured by a Ferranti-Shirley cone-plate viscometer, and a melting point at about 91° C. as measured by differential scanning calorimetry using a DuPont 2100 calorimeter. The Tg of this ink was not measured. The spectral strength of this ink was measured as about 3484 milliliters.Absorbance Units per gram at a lambda$_{max}$ of 555 nm as measured by dilution in n-butanol using a Perkin-Elmer Lambda 25 UV/VIS spectrophotometer. This ink was placed in a Phaser® 340 printer, which uses an offset transfer printing process. The ink was printed using a print head temperature of 140° C., a drum temperature of 60° C. and a paper preheat temperature of 60° C. The finished prints were found to have a color value as measured in an Applied Color Sciences calorimeter of L*=51.2, a*=81.4, and b*=−28.7.

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading, Pa.
[4] Neptun Red Base NB 543 LD—Dye available from BASF Co., Renssalear, N.Y.
[5] Biosoft S-100—Acid available from Stepan Co., Northfield, Ill.

EXAMPLE 4

Magenta Ink Made From Urethane/Urea Resins, Amide Wax, Mixed Magenta Dyes and 0.28% Alkybenzene Sulfonic Acid Additive.

In a stainless steel beaker were combined 228 grams of urethane resin from Example 5 of U.S. Pat. No. 5,830,942, 228 grams of the urethane/urea resin from Example 2 of the same patent, 515 grams of Witco S-180 stearyl stearamide wax[1], and 1.9 grams of Uniroyal Naugard 445 antioxidant[2]. The materials were melted for about 3 hours at 125° C. in an oven, then blended by stirring in a temperature controlled mantle for ½ hr. at 125° C. To the molten ink base was added 2.90 grams of Solvent Red 127 dye[3] 19.2 grams of Solvent Red 49 dye[4] and 2.8 grams of dodecylbenzene sulfonic acid[5]. The resulting magenta ink was then stirred for an additional 2 hours at 125° C. The ink was then filtered through a heated (125° C.) Mott apparatus (available from Mott Mettalurgical) using a 2μ filter at 5 psi. The ink was then poured into molds and allowed to solidify to form ink sticks. This final magenta ink product was characterized by the following physical properties: viscosity of about 13.8 cPs at 140° C. as measured by a Ferranti-Shirley cone-plate viscometer, and a melting point at about 91° C. as measured by differential scanning calorimetry using a DuPont 2100 calorimeter. The Tg of this ink was not measured. The spectral strength of this ink was measured as about 3533 milliliters.Absorbance Units per gram at a lambda$_{max}$ of 555 nm as measured by dilution in n-butanol using a Perkin-Elmer Lambda 25 UV/VIS spectrophotometer. This ink was placed in a Phaser® 340 printer which uses an offset transfer printing process. The ink was printed using a print head temperature of 140° C., a drum temperature of 60° C. and a paper preheat temperature of 60° C. The finished prints were found to have a color value as measured in an ACS spectrophotometer of L*=56.0, a*=77.4, and b*=−28.2.

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading, Pa.
[4] Neptun Red Base NB 543 LD—Dye available from BASF Co., Renssalear, N.Y.
[5] Biosoft S-100—Acid available from Stepan Co., Northfield, Ill.

EXAMPLE 5

Magenta Ink Made From Urethane/Urea Resins, Amide Wax, Mixed Magenta Dyes and 2.4% Alkybenzene Sulfonic Acid Additive.

In a stainless steel beaker were combined 228 grams of urethane resin from Example 5 of U.S. Pat. No. 5,830,942, 228 grams of the urethane/urea resin from Example 2 of the same application, 515 grams of Witco S-180 stearyl stearamide wax[1], and 1.9 grams of Uniroyal Naugard 445 antioxidant[2]. The materials were melted for about 3 hours at 125° C. in an oven, then blended by stirring in a temperature controlled mantle for ½ hr. at 125° C. To the molten ink base was added 2.90 grams of Solvent Red 127 dye[3, 19.2] grams of Solvent Red 49 dye[4] and 24.1 grams of dodecylbenzene sulfonic acid[5]. The resulting magenta ink was then stirred for an additional 2 hours at 125° C. The ink was then filtered through a heated (125° C.) Mott apparatus (available from Mott Mettalurgical) using a 2μ filter at 5 psi. The ink was then poured into molds and allowed to solidify to form ink sticks. This final magenta ink product was characterized by the following physical properties: viscosity of about 13.8 cPs at 140° C. as measured by a Ferranti-Shirley cone-plate viscometer, and a melting point at about 91° C. as measured by differential scanning calorimetry using a DuPont 2100 calorimeter. The Tg of this ink was not measured. The spectral strength of this ink was measured as about 3417 milliliters.Absorbance Units per gram at a lambda$_{max}$ of 555 nm as measured by dilution in n-butanol using a Perkin-Elmer Lambda 25 UV/VIS spectrophotometer. This ink was placed in a Phaser® 340 printer which uses an offset transfer printing process. The ink was printed using a print head temperature of 140° C., a drum temperature of 60° C. and a paper preheat temperature of 60° C. The finished prints were found to have a color value as measured in an ACS spectrophotometer of L*=45.2, a*=79.8, and b*=−22.3.

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading, Pa.
[4] Neptun Red Base NB 543 LD—Dye available from BASF Co., Renssalear, N.Y.
[5] Biosoft S-100—Acid available from Stepan Co., Northfield, Ill.

EXAMPLE 6

Magenta Ink Made From Tetraamide Resin, Tackifier Resin, Amide Wax, Plasticizer, Mixed Magenta Dyes and 0.37% Alkylbenzene Sulfonic Acid Additive.

In a stainless steel beaker heated to about 110° C. was placed about 206.0 grams of a molten phase change ink base similar to that described in Example 3 of U.S. Pat. 5,372, 852, To the molten ink base was added 0.41 grams of Solvent Red 127 dye[1, 2.80] grams of Solvent Red 49 dye[2] and 0.77 grams of dodecylbenzene sulfonic acid[3]. This mixture was stirred for about 1 hour at about 110° C. The resulting magenta ink was then filtered through a heated (110° C.) Mott apparatus available from Mott Metallurgical using a Whatman #3 filter at 15 psi. The ink was then poured into molds and allowed to solidify to form ink sticks. The ink was characterized by the performance features listed in Tables I and II below in the Comparative Tests.

[1] Intraplast Pink 5GLB—Dye available from Crompton and Knowles Co., Reading, Pa.
[2] Neptun Red Base NB 543 LD—Dye available from BASF Co., Renssalear, N.Y.
[3] Biosoft S-100—Acid available from Stepan Co., Northfield, Ill.

EXAMPLE 7

Magenta Ink Made From Urethane/Urea Resins, Amide Wax, Plasticizer, Mixed Magenta Dyes and 1.87% Diphenylether Disulfonic Acid Additive.

In a stainless steel beaker were combined 476.4 grams of urethane resin from Example 5 of U.S. Pat. No. 5,830,942, 476.6 grams of the urethane/urea resin from Example 2 of the same U.S. patent application, 805.9 grams of Witco S-180 stearyl stearamide wax[1] 97.96 grams of Monsanto Santicizer S 278 plasticizer and 3.70 grams of Uniroyal Naugard 445 antioxidant[2]. The materials were melted for about 3 hours at 125° C. in an oven, then blended by stirring in a temperature controlled mantle for 3 hr. at 110° C. To the molten ink base was added 5.56 grams of Solvent Red 127 dye[3] 37.72 grams of Solvent Red 49 dye[4] and 1.87 grams of Dowfax 2AO diphenylether disulfonic acid[5]. The magenta ink was then stirred for an additional 2 hours at 110° C. The ink was then filtered through a heated (110° C.) Mott apparatus (available from Mott Mettalurgical) using a #3 Whatman filter at 15 psi. The ink was then poured into molds and allowed to solidify to form ink sticks. The Tg of the final ink was not measured. The spectral strength of this ink was measured in n-butanol as about 3447 milliliters. Absorbance Units per gram at a lambda$_{max}$ of 546 nm. This ink was placed in a Phaser® 340 printer which uses an offset transfer printing process. The ink was printed using a print head temperature of 140° C., a drum temperature of 48° C. and a paper preheat temperature of about 60° C. The finished prints were found to have a color value as measured in an ACS spectrophotometer of L*=53.91, a*=84.37, and b*=−34.11.

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading Pa.
[4] Neptun Red Base NB 543 LD—Dye available from BASF Co., Renssalear, N.Y.
[5] Santicizer S278—Plasticizer available from Monsanto Chemical Company, St. Louis, Mo.
[6] Dowfax 2AO—Acid available from Dow Chemical Company, Midland, Mich.

EXAMPLE 8

Magenta Ink Made From Urethane/Urea Resins, Amide Wax, Mixed Magenta Dyes and 0.25% p-Toluene Sulfonic Acid Additive.

In a stainless steel beaker were combined 100 grams of urethane resin from Example 5 of U.S. Pat. No. 5,830,942, 100 grams of the urethane/urea resin from Example 2 of the same U.S. patent, 200 grams of Witco S-180 stearyl stearamide wax[1], and 0.8 grams of Uniroyal Naugard 445 antioxidant[2]. The materials were melted for about 3 hours at 125° C. in an oven, then blended by stirring in a temperature controlled mantle for 3 hours at 110° C. To the molten ink base was added 1.2 grams of Solvent Red 127 dye[3], 8.0 grams of Solvent Red 49 dye[4] and 1.1 grams of p-toluenesulfonic acid[5]. The magenta ink was then stirred for an additional 2 hours at 110° C. The ink was then filtered through a heated (110° C.) Mott apparatus (available from Mott Mettalurgical) using a #3 Whatman filter at 15 psi. The ink was then poured into molds and allowed to solidify to form ink sticks. The ink was characterized by the following physical properties: viscosity of 14.0 cPs at 140° C. and a Tg of 32° C. as measured by Dynamic Mechanical Analysis using a Rheometrics Solids Analyzer (RSAII). The melting point of this sample was not measured. The spectral strength of this ink was measured in n-butanol as about 3470 milliliters. Absorbance Units per gram at a lambda$_{max}$ of 550 nm using a Perkin Elmer Lambda 25 UV/VIS spectrophotometer. This ink was placed in a Phaser® 340 printer which uses an offset transfer printing process. The ink was printed using a print head temperature of 140° C., a drum temperature of about 60° C. and a paper preheat temperature of about 60° C. The finished prints were found to have a color value as measured in an ACS spectrophotometer of L*=54.5, a*=79.6, and b*=−28.44.

[1] Kemamide S-180—Stearyl Stearamide available from Witco Chemical Company of Memphis, Tenn.
[2] Naugard 445—Antioxidant available from Uniroyal Chemical Company of Oxford, Conn.
[3] Intraplast Pink 5GLB—Dye available from Crompton and Knowles Co., Reading Pa.
[4] Neptun Red Base NB 543 LD—Dye available from BASF Co., Renssalear, N.Y.
[5] p-Toluene Sulfonic Acid—available from Aldrich Chemical Company, Milwaukee, Wis.

Comparative Tests

Comparative Test A

Dye Diffusion

A sample of the magenta ink described above in Example 6 was placed in a phase change printer along with complementary cyan, yellow and black inks similar to those described in Example 3 of U.S. Pat. No. 5,372,852. A test image was printed which contained several test panels. A typical test panel in the test image was composed of from about forty to one hundred percent of the test area being covered by a first color and about forty percent of the test area being covered by a second color. The CIE L*a*b* values of the test panels were measured on an Applied Color Systems Spectrophotometer. The test images were placed in an oven maintained at 45° C. and after 336 hours, the CIE L*a*b* values were redetermined. The ΔE values of the test panels were calculated according to well-known procedures. The table below represents the results of this test. Control samples were also printed using a magenta phase change ink as described in Example 3 of U.S. Pat. No. 5,372,852,

TABLE I

| Printed Test Panel | Test Panel Composition | | | Magenta Ink | |
|---|---|---|---|---|---|
| Panel | Cyan | Magenta | Yellow | ΔE (Example 6) | ΔE (Example 3, U.S. Pat. No. 5,372,852) |
| 1 | 40 | 40 | 0 | 3.46 | 18.34 |
| 2 | 0 | 40 | 40 | 5.53 | 10.12 |
| 3 | 100 | 40 | 0 | 7.31 | 21.53 |
| 4 | 0 | 40 | 100 | 10.01 | 14.81 |

Comparative Test B

Color Development

The ink from Example 6 was placed in a phase change printer and a test image composed of one hundred percent coverage of magenta ink was printed as described in Example 2 of U.S. Pat. No. 5,372,852, For comparative purposes indicated below as Control, a second test image was also prepared using a conventional magenta phase change ink prepared as described in Example 3 of the same U.S. patent. The CIE L*a*b* values of these inks were measured as described in Comparative Test A, above. The results of these measurements are listed below in the following table. It will be noted that the apparent hue angle (Φ) is essentially unchanged in the two printed samples. In contrast the chroma (C*) is substantially increased in the case of the magenta ink from Example 6 containing alkylbenzene sulfonic acid creating a more intense magenta print. Finally, the decrease in L* of the printed magenta sample from Example 6 results in a darker magenta print compared to the conventional magenta phase change ink.

TABLE II

| CIE values | Magenta Ink (Example 6) | Magenta Ink (Control) |
|---|---|---|
| L* | 50.27 | 58.01 |
| a* | 80.16 | 71.26 |
| b* | −33.31 | −28.45 |
| C* | 86.8 | 76.73 |
| ø | 337.4 | 338.2 |

Comparative Test C
Enhanced Lightfastness

Samples of printed magenta inks described in Comparative Test B above were subjected to accelerated fluorescent lightfastness testing using an Atlas Fadeometer fitted with a bank of fluorescent lights. Measurements of the respective samples' CIE L*a*b* values were determined before and after exposure of the samples. After 100 hours of exposure the CIE L*a*b* values were redetermined and ΔE values were calculated. The color change of the magenta test panel from the ink of Example 6 containing alkylbenzene sulfonic acid was determined to be 22.0 units. The color change for the conventional magenta test panel was determined to be 27.2 units. A clearly discernible difference in the lightfastness performance is therefore noticeable when the two samples are compared.

Comparative Test D
Demonstration of Differing Color Values of Printed Samples Containing Differing Amounts of Alkylbenzene Sulfonic Acid

TABLE III

| Test Ink Example | % DDBSA | L* | a* | b* |
|---|---|---|---|---|
| 1 | 0% | 66.3 | 61.1 | −18.9 |
| 2 | 0.28% | 56.0 | 77.4 | −28.2 |
| 3 | 0.48% | 53.4 | 80.3 | −28.8 |
| 4 | 0.68% | 51.2 | 81.4 | −28.7 |
| 5 | 2.4% | 45.2 | 79.8 | −27.3 |

While the invention has been described above with reference to specific embodiments thereof, it is apparent that many changes, modifications and variations can be made without departing from the inventive concept disclosed herein. For example, the organic sulfonic acid employed to develop the magenta colorant of the present invention can include any suitable phase change ink carrier soluble class of organic sulfonic acids. Specifically, aromatic sulfonic acids, substituted aromatic sulfonic acids, and alkyl and linear alkyl based sulfonic acids can be employed. Of the aromatic sulfonic and substituted aromatic sulfonic acids, alkyl substituted aromatic and linear alkyl substituted aromatic sulfonic acids exhibit particular utility. Of the alkyl and linear based sulfonic acids, lauryl sulfonic acid and other long chain fatty sulfonic acids are preferred. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink composition comprising in combination:
   (a) a phase change carrier composition;
   (b) at least one compatible phase change magenta dye colorant material; and
   (c) at least one organic sulfonic acid compound.

2. The phase change ink composition of claim 1 wherein said organic sulfonic acid compound is one or more alkyl benzene sulfonic acid compounds.

3. The phase change ink composition of claim 1 wherein said organic sulfonic acid compound is para-toluenesulfonic acid.

4. The phase change ink composition of claim 1 wherein said organic sulfonic acid compound is dodecylbenzenesulfonic acid.

5. The phase change ink composition of claim 1 wherein the amount of organic sulfonic acid compound is about 2% to about 100%, by weight of the total magenta colorant material in the ink.

6. The phase change ink composition of claim 1 wherein said phase change carrier composition comprises the combination:
   (a) a urethane resin that is the reaction product of the reaction of at least one alcohol and an isocyanate, wherein the alcohol is selected from the group consisting of a monohydric aliphatic alcohol, a monohydric aromatic alcohol, a monohydric aliphatic/aromatic alcohol, a monohydric fused ring alcohol, a polyol and mixtures thereof: and/or;
   (b) a mixed urethane/urea resin that is the reaction product of at least one alcohol, an isocyanate, and at least one amine; and
   (c) at least one mono-amide.

7. The phase change ink composition of claim 6 wherein the isocyanate in the urethane resin is selected from the group consisting of a monoisocyanate, a diisocyanate, a triisocyanate, a copolymer of a diisocyanate, and a copolymer of a triisocyanate.

8. The phase change ink composition of claim 7 wherein the isocyanate in the urethane resin is an isophorone diisocyanate.

9. The phase change ink composition of claim 6 wherein the alcohol in the urethane resin is selected from the group consisting of hydroabietyl alcohol, octylphenol ethoxylate and octadecyl alcohol.

10. The phase change ink composition of claim 9 wherein the alcohol in the urethane resin is octylphenol ethoxylate.

11. The phase change ink composition of claim 6 wherein the alcohol in the mixed urethane/urea resin is selected from the group consisting of a monohydric aliphatic alcohol, a monohydric aromatic alcohol, a monohydric aliphatic/aromatic alcohol, a monohydric fused ring alcohol, a polyol and mixtures thereof.

12. The phase change ink composition of claim 11 wherein the alcohol in the mixed urethane/urea resin is selected from the group consisting of hydroabietyl alcohol, octylphenol ethoxylate and octadecyl alcohol.

13. The phase change ink composition of claim 6 wherein the isocyanate employed in making the mixed urethane/urea resin is selected from the group consisting of a monoisocyanate, a diisocyanate, a triisocyanate, a copolymer of a diisocyanate, and a copolymer of a triisocyanate.

14. The phase change ink composition of claim 6 wherein the amine in the mixed urethane/urea resin is selected from the group consisting of an aliphatic monoamine, an aromatic monoamine, an aliphatic/aromatic monoamine, a fused right system monoamine, a multifunctional monoamine, and a hydroxyl/amino containing compound.

15. The phase change ink composition of claim 14 wherein the amine in the mixed urethane/urea resin is octadecyl amine.

16. The phase change ink composition of claim 6 wherein said mono-amide is stearyl stearamide.

17. The phase change ink composition of claim 1 wherein said ink further comprises at least one polyethylene wax.

18. The phase change ink composition of claim 17 wherein the polyethylene wax has a molecular weight of about 500 to about 5,000.

19. The phase change ink composition of claim 1 further comprising at least one anti-oxidant.

20. The phase change ink composition of claim 1 wherein said organic sulfonic acid compound is a diphenylether disulfonic acid.

21. A method for producing a layer of a phase change ink on a surface of a substrate, which comprises:

(1) forming a phase change ink composition in the solid phase, comprising an admixture of (a) a phase change carrier composition and (b) at least one compatible phase change magenta dye colorant material; and (c) at least one organic sulfonic acid compound;

(2) transferring said solid phase, phase change ink composition to a phase change ink application means;

(3) raising the operating temperature of said application means to a level whereby a liquid phase, phase change ink composition is formed;

(4) providing a substrate in proximity to said application means;

(5) applying a predetermined pattern of said liquid phase, phase change ink composition to at least one surface of said substrate; and (6) lowering the temperature of said applied ink composition to form a solid phase, phase change ink pattern on the substrate.

22. A method for producing a layer of a phase change ink on the surface of a substrate, which comprises:

(1) employing in a printing apparatus a phase change ink composition in the solid phase comprising an admixture of (a) a phase change carrier composition and (b) at least one compatible phase change dye colorant material; and (c) at least one organic sulfonic acid compound;

(2) applying the phase change ink composition in a desired pattern to an intermediate transfer surface;

(3) transferring the desired pattern of the phase change ink composition to the surface of the substrate.

* * * * *